United States Patent
Jang et al.

(10) Patent No.: US 7,564,533 B2
(45) Date of Patent: Jul. 21, 2009

(54) LINE ON GLASS TYPE LIQUID CRYSTAL DISPLAY DEVICE

(75) Inventors: Byung Hoon Jang, Gyeongsangbuk-do (KR); Wang Seob Kil, Daejun-Si (KR)

(73) Assignee: LG Display Co., Ltd., Seoul (KR)

( * ) Notice: Subject to any disclaimer, the term of this patent is extended or adjusted under 35 U.S.C. 154(b) by 366 days.

(21) Appl. No.: 11/449,740

(22) Filed: Jun. 9, 2006

(65) Prior Publication Data

US 2007/0153167 A1     Jul. 5, 2007

(30) Foreign Application Priority Data

Dec. 29, 2005    (KR)  ................... 10-2005-0133666

(51) Int. Cl.
*G02F 1/1333*     (2006.01)
*G02F 1/1339*     (2006.01)

(52) U.S. Cl. .............. 349/153; 349/110; 349/155
(58) Field of Classification Search ............ 349/110, 349/139, 153
See application file for complete search history.

(56) References Cited

U.S. PATENT DOCUMENTS

| 2002/0008815 A1* | 1/2002 | Hanakawa et al. | 349/113 |
| 2006/0139553 A1* | 6/2006 | Kang et al. | 349/149 |

* cited by examiner

*Primary Examiner*—Andrew Schechter
*Assistant Examiner*—Lauren Nguyen
(74) *Attorney, Agent, or Firm*—Holland & Knight LLP

(57) ABSTRACT

A liquid crystal display device includes a first substrate divided into a display region and a non-display region, the non-display region including a circuit part, and a second substrate having a black matrix with recessed regions corresponding to exposed metal lines of the circuit part of the first substrate.

7 Claims, 5 Drawing Sheets

LINE ON GLASS TYPE LIQUID CRYSTAL DISPLAY DEVICE

The present invention claims the benefit of Korean Patent Application No. P2005-133666 filed in Korea on Dec. 29, 2005, which is hereby incorporated by reference in its entirety.

BACKGROUND OF THE INVENTION

1. Field of the Invention

The present invention relates to a display device, and more particularly, to a liquid crystal display device (LCD). Although the present invention is suitable for a wide scope of applications, it is particularly suitable for preventing a short circuit between a circuit part and a common electrode of a liquid crystal panel.

2. Description of the Related Art

As the information society develops, display device technology is at the forefront of human-machine or human-human communication. The increasing use of computer and other visual media equipment is increasing the demand for light and thin flat-panel display devices. Of the flat-panel display devices, an LCD is widely used as a monitor in a notebook or a desktop computer because the LCD can be driven at a low voltage and has excellent resolution, color rendering, and image quality.

The LCD includes two substrates each having electrodes for electric field generation. The two substrates are disposed such that their surfaces, where the electrodes are formed, face each other and a liquid crystal material is injected between the two substrates. Then, the orientation of the long thin liquid crystal molecules of the liquid crystal material is controlled by a voltage applied to the two electrodes, thereby controlling light transmittance. When individual pixels are controlled in such a manner corresponding to image data, the LCD displays an image.

FIG. 1 is a schematic perspective view of a related art liquid crystal panel, and FIG. 2 is a cross-sectional view of region A' in FIG. 1. As illustrated in FIG. 1, the liquid crystal panel 505 includes a lower substrate 550 provided with a plurality of devices (not shown), an upper substrate 510 provided with color filters (not shown), and a sealant 600 bonding the upper substrate 510 and the lower substrate 550 together. The sealant 600 is formed at the edges of the two substrates. The lower substrate 550 is larger than the upper substrate 510 such that a data pad part 630 connected to a driving circuit for driving the liquid crystal panel 505 is provided at an edge of the lower substrate 550 of the liquid crystal panel 505 outside of the upper substrate 510. Also, a gate circuit part 620 can be provided at another edge of the lower substrate 550 outside of the upper substrate 510.

As shown in FIG. 2, the liquid crystal panel 505 includes a pixel region (active area—A/A) 610 for displaying an image. The lower substrate 550 of the pixel region 610 includes a plurality of gate lines (not shown) and a plurality of data lines (not shown) crossing each other at a right angle, a thin film transistor (TFT) provided at each crossing, and pixel electrodes provided in regions defined by the gate lines and the data lines. The upper substrate 510 of the pixel region 610 includes color filters for implementing colors, a black matrix 520 for preventing light crosstalk, and a common electrode 530 facing each of the pixel electrodes provided on the lower substrate 550.

A line on glass (LOG) technology is used in the gate circuit part 620 such that a gate drive IC is formed directly on the lower substrate 550. The data pad part 630 includes data pad lines (not shown) transferring an image signal supplied from a data driver integrated circuit (not shown) to the data line of the pixel region 610. The data driver integrated circuit (IC) is mounted on a tape carrier package (TCP) and is connected to the data pad part 630 of the lower substrate 550 by a TAB method.

As shown in FIG. 2, a sealant 610 bonds the upper substrate 510, including the black matrix 520 and the common electrode 530, to the lower substrate 550, including an array layer 555 having the TFT and the pixel electrode. Signal lines 570 of the gate circuit part 620 are connected to the gate lines of the pixel region 610 by connection lines (not shown) on the lower substrate 550 to supply a gate driving signal generated from the gate circuit part 620 to the gate lines (not shown) of the pixel region 610. A contact part 580 electrically connected to the connection line (not shown) is exposed to the outside at the signal line region 570 of the gate circuit part 620 of the lower substrate 550. The contact part 580 is formed by removing an insulation film 590 formed on the signal line 570. Thus, a gate signal from the gate circuit part 620 can be supplied to the gate lines of the pixel region 610 through the connection lines.

An electrical shorting problem may occur between the signal lines of the gate circuit part 620 and the common electrode 530 of the upper substrate 510 because of conductive balls 605 included in the sealant 600 used to bond the upper and lower substrates 510 and 550 together. The sealant contains conductive balls to supply a common voltage from the lower substrate 550 to the common electrodes of the upper substrate 510. The reason for the shorting problem is that when the sealant 600 including the conductive balls 605 is applied, some of the conductive balls 605 contact the contact part 570 of the gate circuit part 620 and the common electrode 530 of the upper substrate 510. Consequently, a problem occurs in that gate signals supplied from the gate circuit part 620 leak to the common electrode 530 through the conductive balls 605 or a common voltage applied to the common electrode 530 leaks to a gate line. Such leakage and/or distortion of the common voltage degrades image quality.

SUMMARY OF THE INVENTION

Accordingly, the present invention is directed to a liquid crystal display device (LCD) that substantially obviates one or more problems due to limitations and disadvantages of the related art.

An object of the present invention is to provide a liquid crystal display device capable of preventing a short circuit between a gate circuit part formed on an array substrate and a common electrode formed on a color filter substrate.

An object of the present invention is to provide a liquid crystal display device having improved image quality.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a liquid crystal display device includes a first substrate divided into a display region and a non-display region, the non-display region including a circuit part, and a second substrate having a black matrix with recessed regions corresponding to exposed metal lines of the circuit part of the first substrate.

In another aspect of the present invention, there is provided a liquid crystal display device including a first substrate divided into a display region, including pixel electrodes and switching elements, and a non-display region, including signal supply lines, a gate circuit part, connection lines and contact parts connecting the signal supply lines with the gate circuit part to apply a signal to the display region, a second substrate divided into a display region, including color filter layers, a black matrix, and a common electrode corresponding to the pixel electrodes of the first substrate, and a non-display region, including a black matrix corresponding to the non-display region of the first substrate, and recessed regions in the black matrix corresponding to the connection lines and the contact parts, and a sealant containing conductive balls bonding the first and second substrates together.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
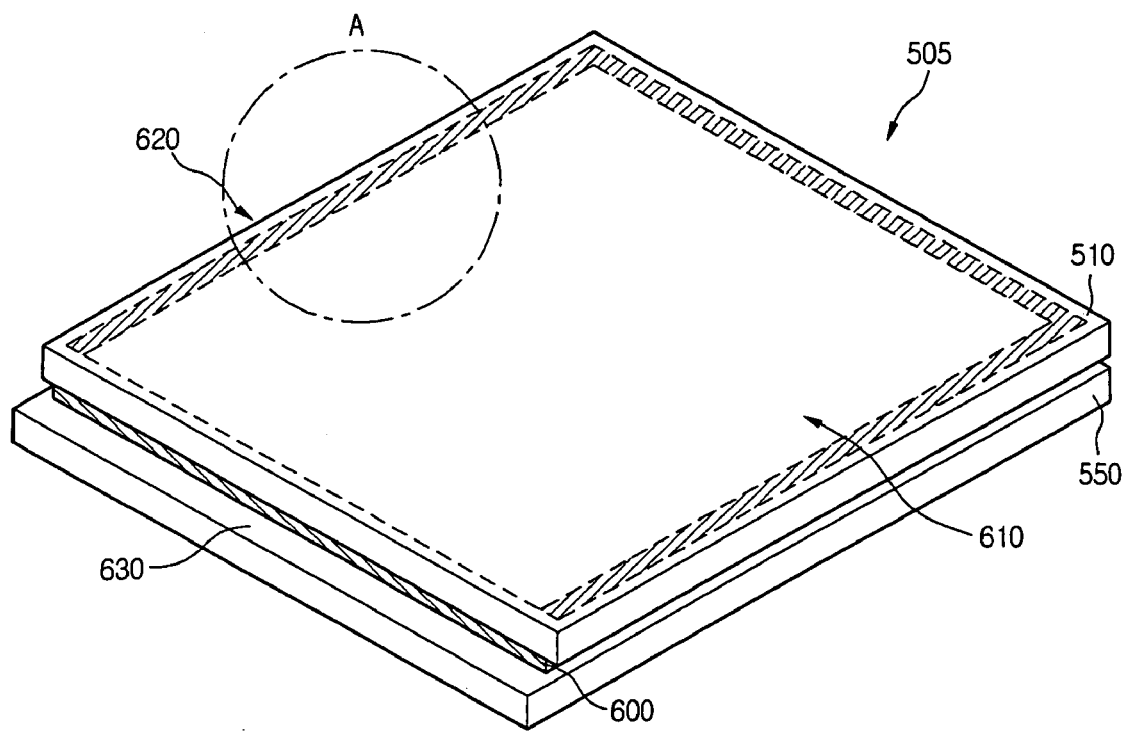
FIG. 1 is a schematic perspective view of a related art liquid crystal panel.
Figure 2:
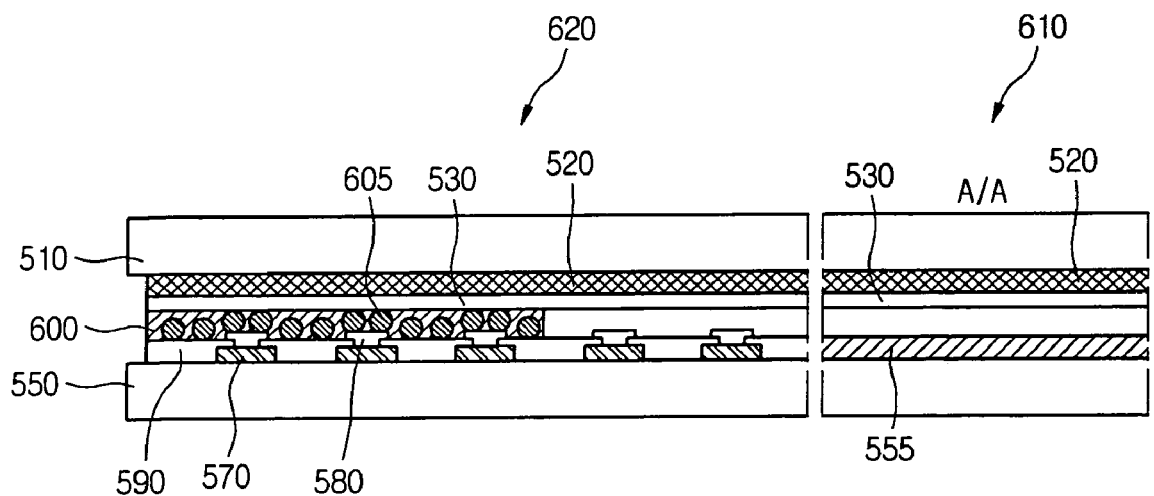
FIG. 2 is a cross-sectional view of region A in FIG. 1.
Figure 3:
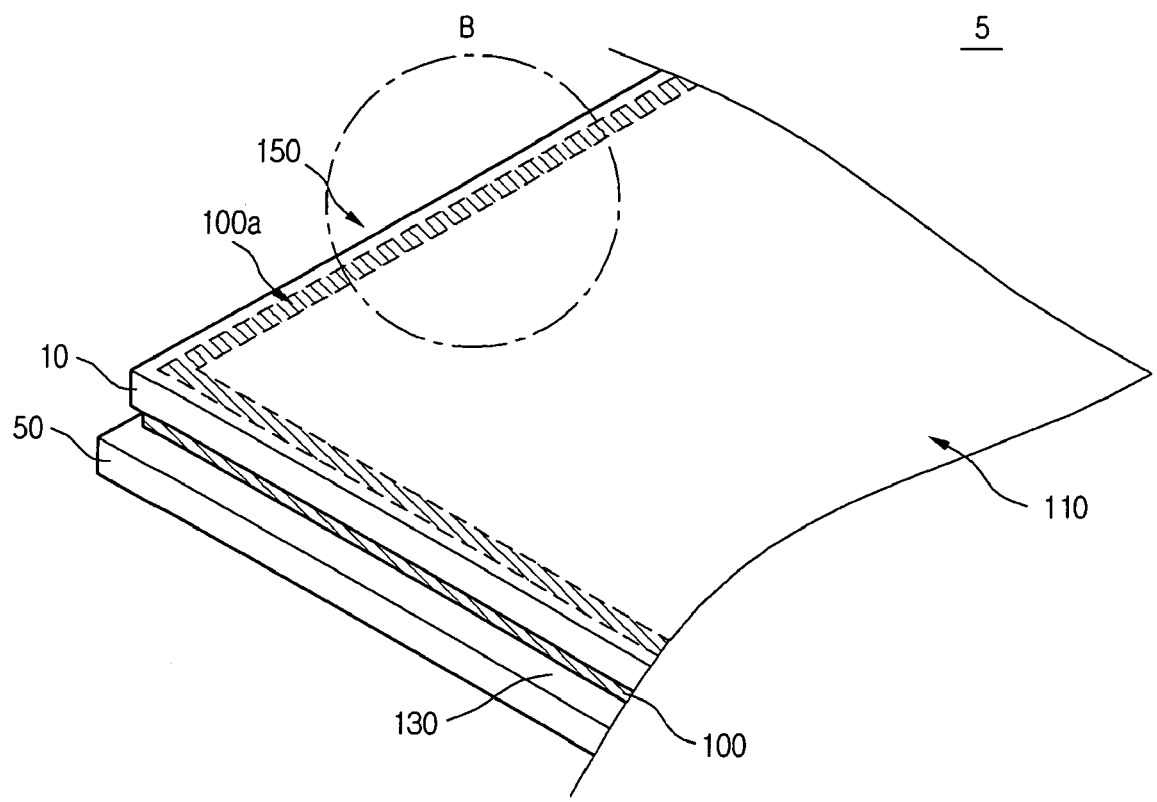
FIG. 3 is a perspective view of a liquid crystal panel according to an embodiment of the present invention.

FIG. 3 is a perspective view of a liquid crystal panel according to an embodiment of the present invention. As shown in FIG. 3, the liquid crystal panel 5 according to an embodiment of the present invention includes a lower substrate 50, including gate lines (not shown) and data lines (not shown) crossing each other, an upper substrate 10, including color filters (not shown), and a sealant 100 provided between the lower substrate 50 and the upper substrate 10 to bond the lower and upper substrates 50 and 10 together. The sealant 100 is at the edges of the liquid crystal panel 5. The liquid crystal panel 5 includes a plurality of cells defined by the gate lines and the data lines to form a pixel region 110 where an image is displayed. The lower substrate 50 includes a data pad part 130 at its outer edge that applies data signals to the data lines, and a gate circuit part 120 on an edge adjacent to the data pad part 130.

Figure 4:
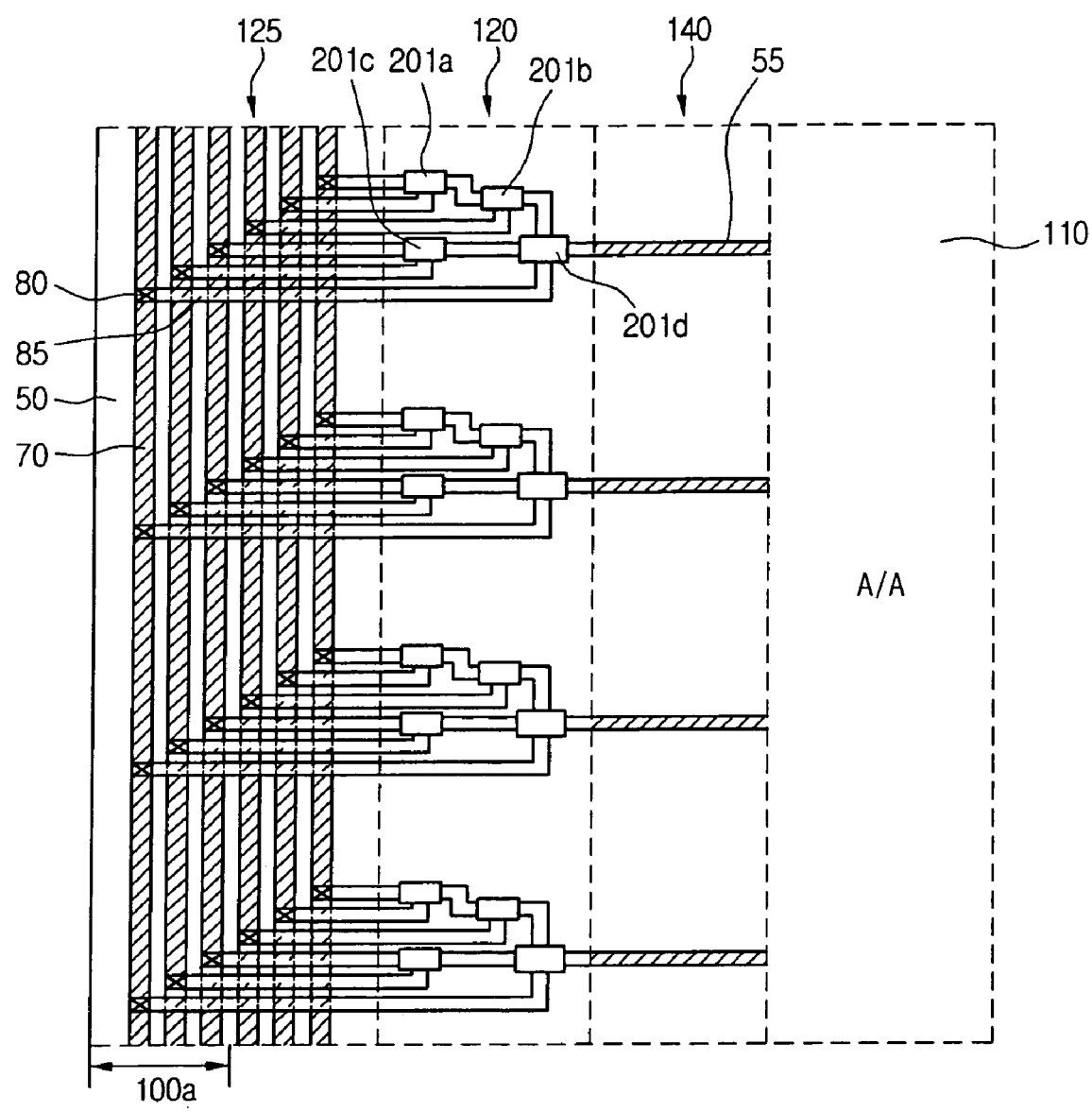
FIG. 4 is a plan view illustrating an enlarged region B of FIG. 3.

FIG. 4 is a plan view illustrating region B of FIG. 3. As shown in FIG. 4, the region B of the lower substrate 50 includes a signal supply part 125 having signal supply lines 70, a gate pad part 140 receiving signals supplied from the signal supply part 125, and a pixel region 110 receiving a driving signal from each gate line 55 formed in the gate pad part 130. Each of the signal supply lines 70 provide voltage signals supplied from a power supply unit, such as a gate high voltage signal (VGH), a gate low voltage signal (VGH), a common voltage signal (VCOM), a ground voltage signal (GND) and a power voltage signal (VCC). The signal supply lines 70 can also be used to carry gate control signals supplied from a timing controller, such as a gate start pulse (GSP), a gate shift clock signal (GSC) and a gate enable signal (GOE).

A gate circuit part 120 is formed between the signal supply part 125 and the gate pad part 140, and controls a signal supplied from the signal supply part 125 to supply the signal to each gate line 55 of the gate pad part 140. The gate circuit part 120 includes circuit groups 201 that each include first switching elements 201a, second switching elements 201b, third switching elements 201c and fourth switching elements 201d. These circuit groups 201 correspond one-to-one with the gate lines 55 of the gate pad part 140.

The number of switching elements of the circuit groups 201 may be varied depending on a signal processing method and the number of signals. Also, the signal supply lines 70 of the signal supply part 125 are electrically connected to the gate circuit part 120 by connection lines 85. Here, the connection lines 85 are formed in groups corresponding to the circuit groups 201, and send signals to the circuit groups 201 of the gate circuit part 120 on group basis. Accordingly, the signals applied to the gate circuit part 120 from the signal supply lines 70 are controlled on a circuit group basis and are then supplied to the gate lines 55.

As shown in FIG. 4, groups of six connection lines 85 respectively connected to six signal supply lines 70. One side of each of the connection lines 85 is connected to the signal supply lines 70 by a contact part 80. The other side of each of the connection lines is connected to the circuit group 201 of the gate circuit part 120. Thus, signals from the signal supply lines 70 can be supplied to the gate circuit part 120.

A sealant region 100a is provided in a predetermined region of the signal supply part 125 to bond the lower and upper substrates 50 and 10 together. A sealant is formed in the sealant region 100a. Here, the sealant may be applied onto one of the upper and lower substrates 10 and 50 of the liquid crystal panel. For example, the sealant region 100a can be formed in a predetermined region of the signal supply part 125 at side edges of the lower substrate 50.

Referring to FIGS. 3 and 4, the sealant 100 around the edges of the substrates may contribute to enlarging the pixel region 110 of the liquid crystal panel 5 or reducing a non-display region, thereby improving space efficiency of the liquid crystal panel. However, the sealant 100 contains conductive balls to supply a common voltage from the lower substrate 50 to the common electrode on the upper substrate 10. For this reason, the sealant 100 applied to the signal supply part 125 may cause an undesirable electrical connection between the common electrodes and the contact parts formed on the signal supply lines 70 of the signal supply part 125. To prevent such a problem, embodiments of the present invention have stepped portions formed in a black matrix region of the upper substrate 10 corresponding to the contact parts 80 on the signal supply lines 70, thereby preventing a short circuit.

Figure 5:
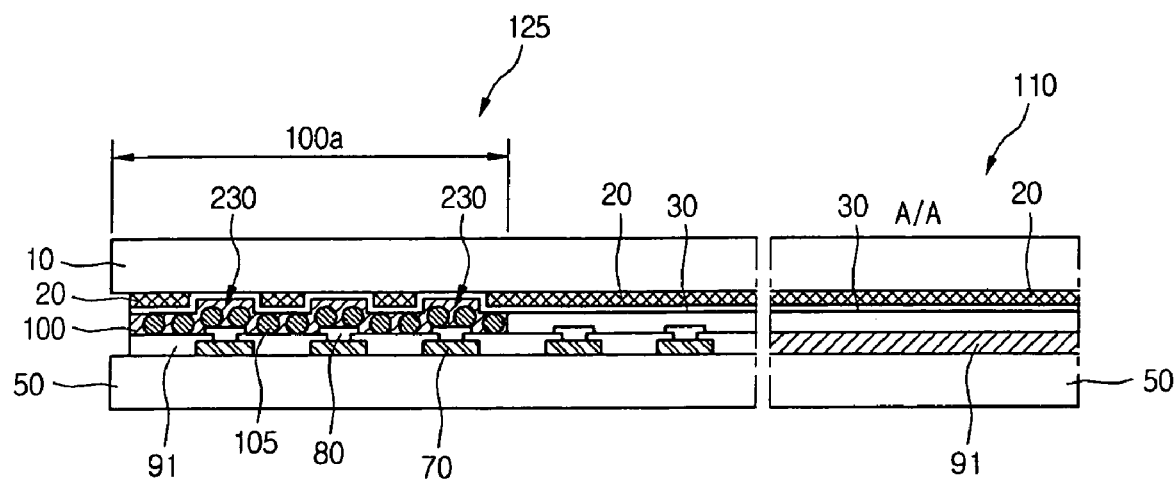
FIG. 5 is a cross-sectional view of the region B in FIG. 3.

FIG. 5 is a cross-sectional view of region B in FIG. 3. As shown in FIG. 5, signal supply lines 70 are formed in the signal supply part 125 of the lower substrate 50, and an insulation film 90, including a gate insulation film and a passivation film, is formed on the signal supply lines 70. Contact parts 80 are formed on the signal supply lines 70, respectively. As described above with regard to FIG. 4, the connection lines 85 are connected to the contact parts 80 to supply gate signals from the signal supply lines 70 to the gate circuit part 120.

A pixel electrode (not shown) and TFTs (not shown) are formed in a matrix configuration in the pixel region 110 of the lower substrate 50. Color filter layers (not shown) and the black matrix 20 are formed on the upper substrate 10, which is attached to the lower substrate 50, and a common electrode 30 of a transparent metal 30 is formed on both the color filter layers and the black matrix 20. More particularly, the black matrix 20 is patterned to divide the color filter layers into a grid and is formed along edges of the upper substrate 10 corresponding to a non-display region, including the signal supply part 125, the gate circuit part 120 and the data pad part 130 of the lower substrate 50.

A sealant 100 is formed in the sealant region 100a on the signal supply part 125 to bond the lower and upper substrates 50 and 10 together. The sealant 100 includes a plurality of conductive balls 105. To prevent a short circuit between the contact parts 80 formed on the first substrate 50 and the common electrode 30 formed on the upper substrate 10 in embodiments of the present invention, portions of the black matrix 20 of the upper substrate corresponding to the contact parts 80 and the connection lines 85 of the lower substrate 50 are removed. Thus, recessed regions 230 where no black matrix 20 exist are formed on the upper substrate 10 corresponding to the contact parts 80 and the connection lines 85 on the lower substrate 50. The common electrode 30 follows a contour of the recesses 230.

A cell gap between the lower and upper substrates 50 and 10 is maintained by the conductive balls 105 formed on portions of the lower substrate 50, excluding the conductive balls 105 on the contact parts 80 and the connection lines 85, as shown in FIG. 5. The conductive balls 105 on the contact parts 80 and the connection lines of the lower substrate 50 are within the recessed regions 230. A short circuit between the contact parts 80 of the first substrate 50 and the common electrodes on the upper substrate 10 does not occur because a diameter of the conductive balls 105 is less than a depth of the recessed regions 230. Thus, the conductive balls 105 can not contact the common electrode in the recessed regions 230.

After the formation of the insulation film 90, a contact hole for the contact part 80 is formed in the insulation film 90. Thereafter, a transparent metal, such as ITO or IZO, is deposited and patterned to form pixel electrodes 91 in the array. The connection lines 85, as shown in FIG. 4, are also formed along with the pixel electrodes 91 for electrical connection between the gate circuit part 120 (circuit groups 201) and the signal supply lines 70. The contact part 80 and the connection line 85 formed on the signal supply line 70 are outside of the upper substrate 10.

Because a short circuit between the common electrodes and the conductive balls 105 occurs when the conductive balls 105 contained in the sealant 100 are placed on the contact parts 80 and the connection lines 85, embodiments of the present invention provide recessed regions 230 in the black matrix 20 of the upper substrate 10, thereby preventing short circuiting.

Although not shown in the drawings, when the recessed regions 230 are formed by completely removing portions of the black matrix 20, a blocking tape may be attached to an outer surface of the upper substrate 10 corresponding to the removed portions to prevent light leakage. However, patterning to form the recessed regions 230 can be carried out such that portions of the black matrix 20 corresponding to the recessed regions 230 are not completely removed but have only a smaller thickness than adjacent portions of the black matrix 20 so that the aforementioned blocking tape is unnecessary because light leakage can be prevented without blocking tape. Depending on the diameter of the conductive balls 105 and the thickness of the black matrix 20, portions of the black matrix 20 in the recessed regions 230 may be completely removed, or may be just formed thinner than other portions of the black matrix 20.

As described above, according to embodiments of the present invention, recessed regions are formed in a black matrix within a non-display region (a signal supply part, a gate circuit part) of a liquid crystal panel, thereby preventing a short circuit between gate signal lines and common electrodes of the pixel array substrate. Accordingly, image quality can be improved by avoiding distortion of a common voltage. In addition, the image quality can be improved by avoiding distortion of a gate signal.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A line on glass type liquid crystal display device, comprising:
   a first substrate divided into a display region and a non-display region, the non-display region including a circuit part; and
   a second substrate having a black matrix with recessed regions corresponding to exposed metal lines of the circuit part of the first substrates,
   wherein the second substrate includes color filter layers and a common electrode,
   wherein the recessed regions are formed by removing portions of the black matrix and common electrode is in the recessed regions,
   wherein the first and second substrates are bonded together by a sealant containing conductive balls,
   wherein the conductive balls on the exposed metal lines of the first substrate are within the recessed regions of the second substrate and spaced apart from the common electrode of the second substrate in the recessed regions,
   wherein the conductive balls are in contact with portions of the first and second substrates to maintain a cell gap between the first and second substrates, excluding the conductive balls on the exposed metal lines of the first substrate,
   wherein a diameter of the conductive balls is less than a depth of the recessed regions.

2. The device according to claim 1, wherein the circuit part includes:
   a signal supply part including signal lines;
   a gate circuit part including switching elements; and
   a gate pad part including gate lines.

3. The device according to claim 1, wherein the display region of the first substrate includes pixel regions that each include a pixel electrode and a switching element.

4. A line on glass type liquid crystal display device, comprising:
   a first substrate divided into a display region, including pixel electrode and switching elements, and a non-display region, including signal supply lines, a gate circuit part, connection lines and contact parts connecting the signal supply lines with the gate circuit part to apply a signal to the display region;
   a second substrate divided into a display region, including color filter layers, a black matrix, and a common electrode corresponding to the pixel electrodes of the first substrate, and a non-display region, including a black matrix corresponding to the non-display region of the first substrate and a recessed regions in the black matrix corresponding to the connection lines and the contact parts; and a sealant containing conductive balls bonding the first and second substrates together, wherein the recessed regions are formed by removing portions of the black matrix and the common electrode is within the recessed regions, wherein the conductive balls are on the connection lines and on the contact parts of the first substrate within the recessed regions of the black matrix, and the conductive balls in the recessed regions are spaced apart from the common electrode on the second substrate, wherein the conductive balls are in contact with portions of the first and second substrates to maintain a cell gap between the first and second substrates, excluding the conductive balls on the connection lines and the contact parts, wherein a diameter of the conductive balls is less than a depth of the recessed regions.

5. A line on glass type liquid crystal display device, comprising:

a first substrate divided into a display region and a non-display region, the non-display region including a circuit part; and a second substrate having a black matrix with recessed regions corresponding to exposed metal lines of the circuit part of the first substrate and a common electrode on the black matrix, wherein the recessed regions are formed by removing portions of the black matrix and the common electrode is within the recessed regions, wherein the first and second substrates are bonded together by a sealant containing conductive balls, wherein the conductive balls are on the exposed metal lines of the circuit part of the first substrate within the recessed regions of the black matrix, and the conductive balls in the recessed regions are spaced apart from the common electrode on the second substrate, wherein the conductive balls are in contact with portions of the first and second substrates to maintain a cell gap between the first and second substrates, excluding the conductive balls on the exposed metal lines of the circuit part, wherein a diameter of the conductive balls is less than a depth of the recessed regions.

6. The device according to claim 5, wherein the circuit part includes:

a signal supply part including signal lines;

a gate circuit part including switching elements; and a gate pad part including gate lines.

7. The device according to claim 5, wherein the conductive balls connect a common voltage supplied from the first substrate to the common electrode on the second substrate, excluding the conductive balls on the exposed metal lines of the circuit part.

* * * * *